May 13, 1930.                    H. P. DORN                    1,758,190
                          ELECTRIC PHONOGRAPH MOTOR
                      Filed March 31, 1926      2 Sheets-Sheet 1
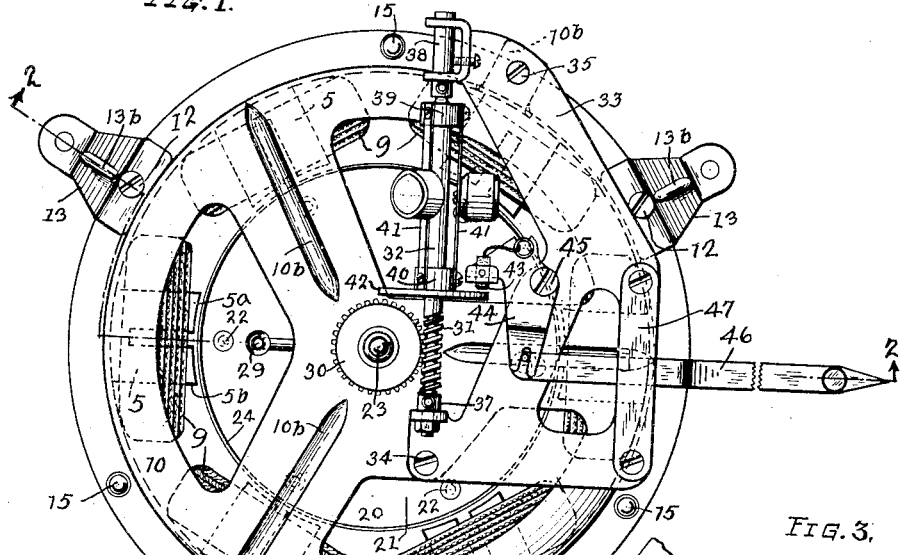
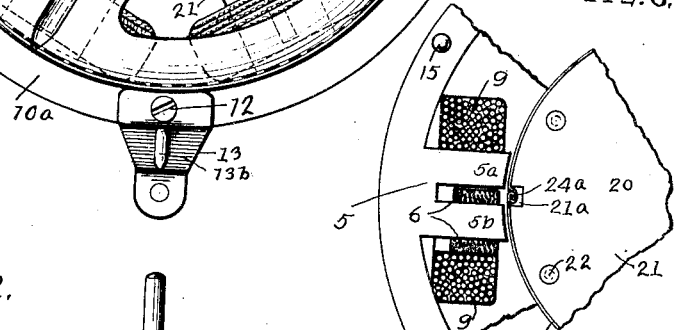
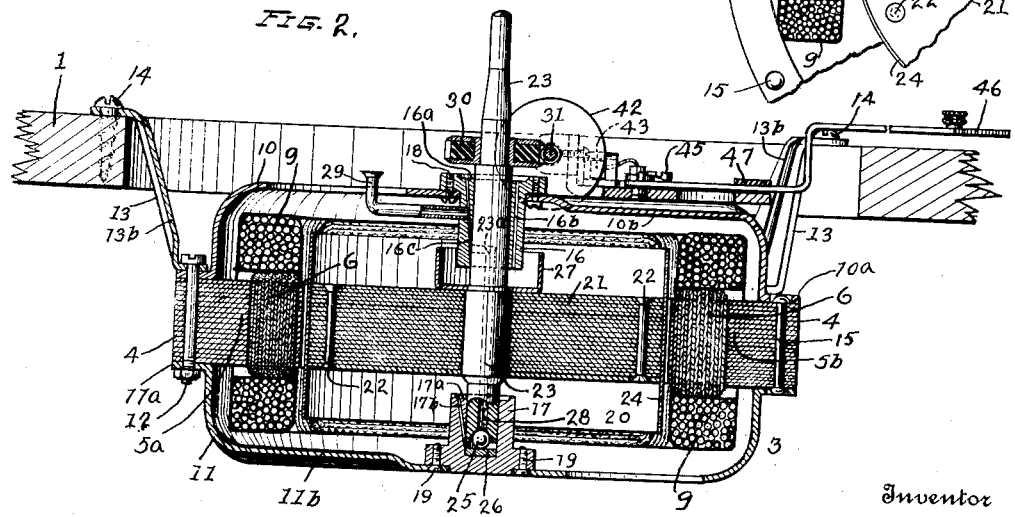
Inventor
Harry P. Dorn
By Ray A. Weber
Attorney May 13, 1930.  H. P. DORN  1,758,190
ELECTRIC PHONOGRAPH MOTOR
Filed March 31, 1926   2 Sheets-Sheet 2

Inventor
Harry P. Dorn
By
Attorney

Patented May 13, 1930

1,758,190

UNITED STATES PATENT OFFICE

HARRY P. DORN, OF CLEVELAND, OHIO, ASSIGNOR TO RAY S. GEHR, OF SHAKER HEIGHTS, OHIO

ELECTRIC PHONOGRAPH MOTOR

Application filed March 31, 1926. Serial No. 98,903.

This invention relates to electric motors especially adapted to the rotation of the record tables or supports of phonographs or talking machines.

The principal objects of the invention are comprehended in the provision at a minimum cost of a motor that is simple in construction, dependable in operation and adapted, when directly connected to the record table or support of a phonograph, to operate quietly on alternating current of commercial frequency to drive the table or support at a highly uniform, suitably slow speed and with ample torque notwithstanding wide variations of the voltage of the current supply.

Further objects, more or less incidental or ancillary to the foregoing will appear in the following description in connection with the accompanying drawings which show a preferred embodiment of the invention.

In the drawings, Fig. 1 is a plan view of the motor.

Fig. 2 is a vertical section on the line 2—2, Fig. 1.

Fig. 3 is a fragmentary view of the rotor and stator parts of the motor, the rotor being shown in plan and one of the stator poles in horizontal section.

Figure 4:
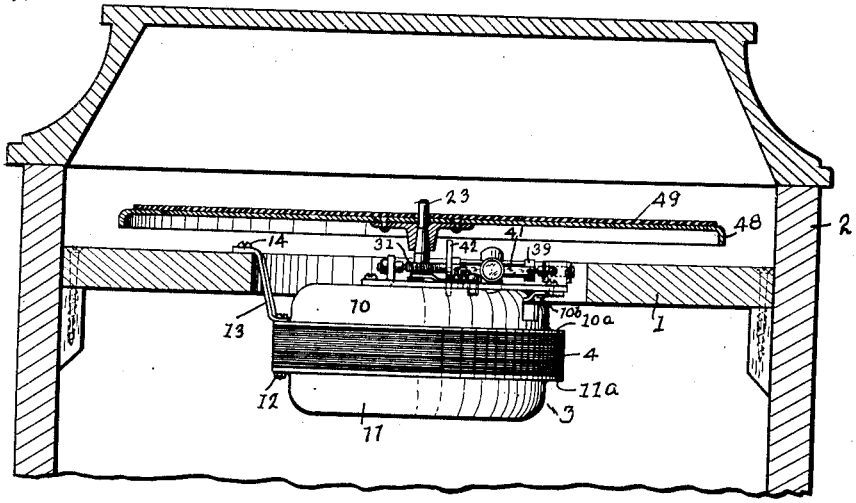
Fig. 4 is a vertical section on a smaller scale of the upper part of a phonograph with my improved motor mounted therein.
Figure 5:
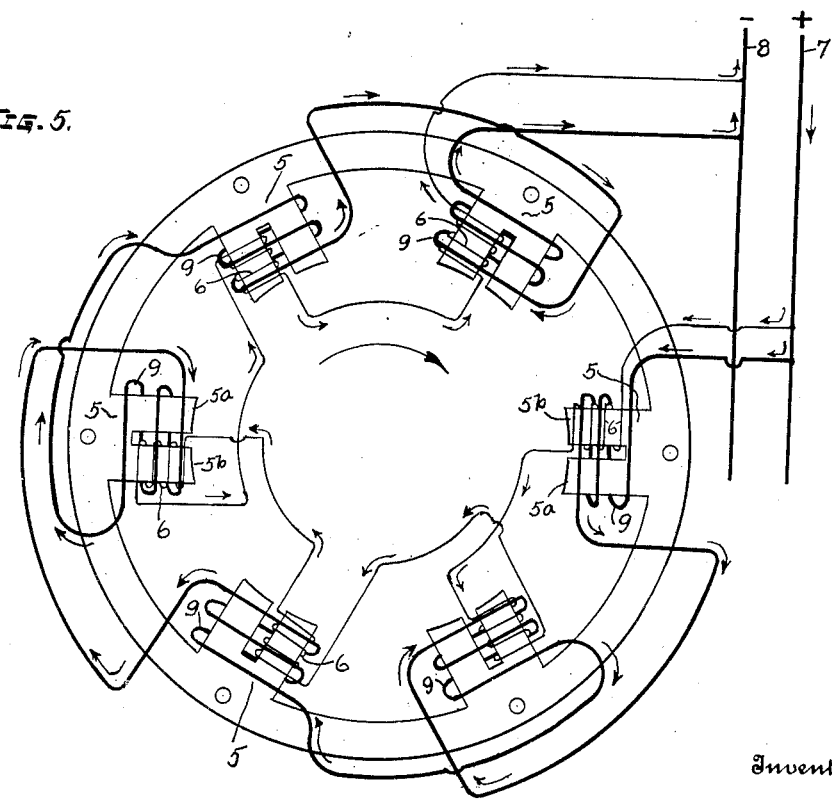
Fig. 5 is a wiring diagram of the stator of the motor.

Referring in detail to the construction illustrated, 1 designates the usual motor supporting board of a phonograph, said board, as indicated in Fig. 4, being removably supported in the case 2 of the phonograph. The motor, which is designated in its entirety by 3, is designed to operate on single-phase, 110-volt, 60 cycle alternating current. The stator structure of the motor comprises an annular laminated iron section 4 which is formed with six inwardly extending, equally spaced poles 5, 5. Each pole is slotted as shown in Fig. 5 to form polar extensions $5^a$, $5^b$. The poles carry split-phase windings comprising a series of fine wire coils 6, 6 which are mounted on the pole extensions $5^b$ and connected in series with each other across the line or source, which is represented by the conductors 7, 8. The windings also comprise a series of coarse wire coils 9, 9 which surround the poles 5 and the fine wire coils 6 thereof and are connected in series across the line in the same manner as the fine wire windings. The primary windings of the motor thus comprise a coarse wire section and a fine wire section which are connected in parallel across the terminals of the motor, and this connection is maintained during the operation of the motor. In the motor illustrated, with a rotor approximately four inches in diameter and laminated iron sections one inch thick, measured axially, each of the fine wire coils 6 has 320 turns of No. 35 copper wire, making the total length of the fine wire windings for the six poles approximately 540 feet. Each of the coarse wire coils 9 has 750 turns of No. 26 copper wire, making the total length of the coarse wire windings for the six coils approximately 3060 feet. With the coils thus wound the current flowing in the coarse wire coils is displaced in phase relative to that flowing in the fine wire coils in the well-known manner, the relatively large inductance of the coarse wire coils causing the current therein to lag relative to the impressed voltage more than the current in the fine wire coils. It is to be observed that the split-phase effect thus secured is quite different from the split-phase effect secured by so-called shaded pole windings.

In my motor as designed the fine wire phase-splitting coil has its axis parallel to and is connected so as to act in the same sense with the main pole or coarse wire coil, and the magneto-motive force induced by the fine wire coil, being partially out of phase with the main magneto-motive force or flux, causes a flux movement in the direction of rotation, but since it is connected so that the current traverses it in the same sense as in the main pole coil, the current or magneto-motive force component of the fine wire coil not out of phase with the main winding magneto-motive force is both in phase and assisting it, instead of opposing it as is the case with some types of shaded pole motors. Consequently my improved stator winding secures a minimum total current consumption and a maximum torque.

To the upper and lower sides of the annular laminated iron section of the stator are secured the bearing support and casing members 10 and 11. These members are preferably pressed from sheet steel of suitable weight, being given a dished formation with peripheral flanges $10^a$ and $11^a$ which are perforated to receive bolts 12, 12 that serve both to secure the members 10 and 11 to the laminated iron structure of the stator and to clamp the laminæ together. These bolts also serve to secure the supporting brackets 13, 13 to the outer part of the stator structure. The supporting brackets 13, which are also preferably stamped from sheet steel, are secured at their upper ends by screws 14 to the motor supporting board 1. For securing the laminæ of the stator structure 4 together, the bolts 12 are supplemented by a series of rivets 15, the heads of which are accommodated by apertures in the flanges $10^a$ and $11^a$. The horizontal parts of the members 10 and 11 are formed with openings as shown in Fig. 1 to afford free ventilation for the motor. To render the members 10 and 11 and the supporting brackets 13 amply stiff they are formed with struck-up ribs $10^b$, $11^b$ and $13^b$, respectively.

The casing members 10 and 11 are formed with central apertures to receive a bearing sleeve 16 and a bearing socket 17, respectively, the sleeve 16 being secured to the member 10 by screws 18 and the bearing 17 being secured to the member 11 by screws 19.

The rotor of the motor, designated in its entirety by the numeral 20, has a cylindrical iron body 21 composed of iron laminæ secured together by rivets 22. The laminated body 21 is fast on the shaft 23 which is supported in the bearings 16 and 17. The secondary conductor carried by the rotor is in the form of a copper band 24 which extends around the periphery of the iron body 21 and is tightly secured thereto by shrinking on. The copper band 24 can be made of a section of seamless copper tubing or, as is shown in Fig. 3, can be made of a strip of sheet copper bent around and connected at its ends by a lap joint $24^a$. In this latter case the iron body 21 is preferably formed with a slot $21^a$ into which the joint can be hammered after the band is shrunk on, thus leaving the periphery of the rotor free from any projection. The joint $24^a$ is preferably soldered to afford good electrical connection. Preferably the band 24 is of a width to extend considerably above and below the laminated iron pole sections of the stator. In a motor of the size above specified the band 24 is formed of .025 inch thick sheet copper.

Referring further to the bearing supports of the rotor, the lower end of the shaft 23 is countersunk to receive a hardened steel thrust ball 25 which in turn rests upon a hardened steel plate 26 in the bottom of the bearing socket 17. The upper end of the bearing socket 17 is formed with an annular depression $17^a$ surrounding the shaft 23 and this depression communicates through a duct $17^b$ drilled through the sleeve with the bottom of the bearing chamber therein.

The rotor carries on its upper side a pressed metal cup 27 which surrounds the shaft and the lower part of the bearing sleeve 16. The cup 27 is preferably secured to the shaft 23 by being forced thereon with a tight fit. The sleeve 16 is formed at its upper end with an annular depression $16^a$ surrounding the shaft 21. A duct $16^b$ extending lengthwise through the sleeve 16 places the depression $16^a$ in communication with the cup 27. The sleeve 16 is also formed with an inclined duct $16^c$ leading from the depression $16^a$ to the inner surface of the sleeve between the ends thereof. At its lower end this duct $16^c$ communicates with the upper end of a duct $23^a$ which leads downward through the shaft 23 to the lower end thereof. In this duct $23^a$ I place a plug 28 of felt or other fibrous material. A tube 29 with flaring upturned end is secured to the sleeve 16 in communication with the duct $16^c$.

When the motor is placed in position the cup 27 is filled or partially filled with oil and the turning of the rotor draws the oil upward between the shaft 23 and the sleeve 16 to the recess or depression $16^a$ when some of the surplus oil returns through the duct $16^b$ to the cup 27 while some flows through the ducts $16^c$ and $23^a$ to the bottom of the bearing cup 17. Oil rising from the bottom of said cup 17. between its walls and the shaft 23 flows into the depression $17^a$ whence the surplus can drain back to the bottom of the cup. The felt 28 in the duct $23^a$ renders the latter in effect a capillary passage and this prevents an excess of oil flowing to the bottom bearing and flooding it. After use of the motor for a considerable period oil can be introduced through the pipe 29 to replenish the supply.

The speed of the motor is controlled by a centrifugal ball governor of the usual type, said governor serving to reduce the speed of rotation far below the free running speed of the motor and hold it at the desired phonograph speed below 100 R. P. M., usually 80 R. P. M. Above the bearing sleeve 16 and fast on the shaft 23 is a worm wheel 30 with teeth adapted to drive a worm 31 formed on the spindle 32 of the centrifugal governor. The spindle 32 is carried by a supporting frame 33 which is secured by screws 34, 35 to the motor casing section 10, the said section 10 being formed with an integral struck-up bracket $10^b$ to support the end of the frame 33 that is secured by the screw 35. The spindle 32 has the usual coned ends which engage adjustable bearing sockets 37, 38 carried by the frame 33. A sleeve 39 is fixedly secured on one end of the spindle 32 while a sleeve 40 is slidably secured on said spindle, the two sleeves being connected by the usual weighted spring arms 41. The sleeve 40 carries a friction disc 42 which moves axially with said sleeve against a brake block 43 of suitable fibre, felt, leather, cork, or the like, said block being mounted in a bell-crank 44 which in turn is pivotally mounted on a screw 45 carried by frame 33. The position of the bell-crank 44 and consequently of the brake block 43 is adjustable by means of a lever 46 pivotally mounted on the frame 33, and frictionally held in adjusted position by the spring clamp 47. By adjustment of lever 46, the governor is caused to regulate the speed of the motor in the well-known manner, the speed ordinarily being held down to 78 or 80 R. P. M.

As shown in Fig. 4, the upper tapered end of the motor shaft 23 carries the turn-table 48 of the phonograph. 49 represents a disc record supported in the usual manner on the table 48.

A motor such as that illustrated and above described can be made to operate satisfactorily for the driving of phonographs on any of the commercial single-phase, alternating current lines commonly used for incandescent lights. Thus the motor illustrated is designed to operate on 110-volt, 60 cycle, single-phase circuits.

In the operation of my improved motor eddy currents are set up in the secondary conductor band 24 by the rotating or shifting field established by the split-phase windings and the movement of the rotor is effected in the same general manner as in the well-known "meter" type of motor. The performance of my motor, however, differs radically from that of any prior motor known to me in which a rotor of the eddy current type is employed. It will be seen that in my motor the iron of the magnetic circuit is carried in part by the stator and in part by the rotor and that the iron mass carried by the rotor affords an exceedingly stable support for the cylindrical secondary conductor so that the latter is not subject to vibration as are the secondary conductors of prior "meter" type motors, known to me and, furthermore, by disposing the stator poles symmetrically around the periphery of the rotor the forces on the latter are substantially entirely in planes at right angles to the axis of rotation and are at all times balanced so that any tendency of the rotor as an entirety to vibrate is obviated. By including a considerable part of the iron mass of the magnetic circuit of the motor in the rotor thereof the rotational inertia of the rotor is very greatly increased in comparison with prior "meter" type motors and the steadiness of the operation correspondingly improved.

Not only is all alternating current vibrations of the rotor structure obviated, in the case of my motor, but also there is afforded a practically complete elimination of so-called alternating current hum from the stator structure. This latter result is secured by making the iron sections of the motor very greatly oversize in comparison with the standards of commercial motor design. In other words, the flux density in my motor is relatively very low, the apparent average air gap density of the motor when running on 110-volt, 60 cycle, single-phase alternating current being something like 3000 lines per square inch, whereas the apparent average air gap density in those motors made in accordance with the usual commercial design standards is over 20,000 lines per square inch.

By eliminating substantially all vibration, noise is obviated and the motor is practically silent in operation. Furthermore, the motor drives the turn-table at a highly uniform speed, the torque of the motor being ample under all phonograph and electrical circuit conditions including voltage variations ranging from 80 volts to 150 volts. The ample character of the torque is evidenced by the rapid pick-up of the motor, it being capable of going from rest to 80 R. P. M. in three to four seconds. The current consumption of motor for phonograph drive is moderate, the energy required being only about 50 watts. The combination of moderate current consumption and ample torque is due in large measure to the character of the stator structure and windings.

The method of forming the motor bearing supports or casing sections 10 and 11 from sheet metal secures both lightness in weight and low cost as well as ample strength, and the method of attaching these casing members 10 and 11 to the laminated iron stator structure is exceedingly simple and effective and produces a very compact form of construction. The advantages of the oiling system of the motor bearings will be obvious from the foregoing description. However, the features referred to in this paragraph and also the stator windings are not claimed here in in their broader aspects as they constitute the subject matter of my copending application Serial No. 98,904, filed March 31, 1926.

In the motor illustrated and above described I present the preferred form of construction but it is to be understood that various modifications can be made without departing from the invention, the scope of the invention being indicated by the appended claims.

What I claim is:

1. In a phonograph, the combination of a rotatable record support; an induction motor comprising a rotor connected to drive and turn in unison with the record support and having a cylindrical laminated iron core and a secondary current conductor in the form of a band extending circumferentially around said core, a stator having iron polar projections with their polar faces disposed adjacent to the circumferential face of the rotor, and split phase primary windings on at least one of said polar sections, said windings comprising two sections which are continuously connected in parallel across the terminals of the motor during operation thereof; and a braking governor acting on the record support and rotor to reduce the rotation of the rotor to a speed far below its free running speed and to hold the said rotation at the desired phonograph speed below 100 R. P. M.

2. In an induction motor, the combination of a rotor having a cylindrical laminated iron core and a secondary current conductor in the form of a band extending circumferentially around said core; an annular laminated iron stator structure formed with a plurality of inwardly extending pole sections disposed symmetrically around the rotor with their polar faces adjacent the band conductor thereof, each of said pole sections being divided radially into two branches; and a split phase winding on each of said pole sections comprising a fine wire coil which as an entirety surrounds only one of the said pole branches and a coarse wire coil surrounding both of said branches, said fine and coarse wire coils being continuously connected in parallel to the same current source while the motor is in operation.

In testimony whereof, I hereunto affix my signature.

HARRY P. DORN.